United States Patent [19]

Tsugei

[11] Patent Number: 4,912,640

[45] Date of Patent: Mar. 27, 1990

[54] ELECTRONIC TYPE MEMO DEVICE

[75] Inventor: Shinji Tsugei, Nara, Japan

[73] Assignee: Sharp Kabushiki Kaisha, Osaka, Japan

[21] Appl. No.: 642,774

[22] Filed: Aug. 21, 1984

[30] Foreign Application Priority Data

Aug. 24, 1983 [JP] Japan .......................... 58-131445[U]

[51] Int. Cl.[4] .......................... G06F 3/02; G06F 3/14

[52] U.S. Cl. .............................. 364/400; 364/705.06; 364/709.11; 364/920

[58] Field of Search ............... 364/400, 401, 419, 705, 364/709, 900; 382/3

[56] References Cited

U.S. PATENT DOCUMENTS

| | | | |
|---|---|---|---|
| 3,999,050 | 12/1976 | Pitroda | 364/419 |
| 4,115,870 | 9/1978 | Lowell | 364/709 X |
| 4,117,542 | 9/1978 | Klausner | 364/709 X |
| 4,276,541 | 6/1981 | Inoue et al. | 364/900 X |
| 4,279,022 | 7/1981 | Abe | 364/709 X |
| 4,402,056 | 8/1983 | Sado et al. | 364/709 X |
| 4,479,195 | 10/1984 | Herr et al. | 364/900 |
| 4,496,944 | 1/1985 | Collmeyer | 365/49 X |
| 4,633,436 | 12/1986 | Flurry | 364/900 |

FOREIGN PATENT DOCUMENTS

| | | | |
|---|---|---|---|
| 60-7526A | 1/1985 | Japan | 364/709 |
| 60-581A | 5/1985 | Japan | 364/709 |

*Primary Examiner*—Jerry Smith
*Assistant Examiner*—Charles B. Meyer
*Attorney, Agent, or Firm*—Birch, Stewart, Kolasch & Birch

[57] ABSTRACT

An electronic type memo device that stores hand-written input data in pairs with index data and read the desired hand-written data by retrieving the index data. This device features extremely simplified operational procedures in executing input, registration, and retrieval of these data and can be operated efficiently. The electronic type memo device includes a hand-written data input unit allowing the entry of the hand-written data; a key input unit containing the index data input allowing the entry of the index data including time, dates, and pages; and memory unit that respectively store the hand-written data fed from the key input unit and the index data in pairs.

1 Claim, 2 Drawing Sheets

ELECTRONIC TYPE MEMO DEVICE

BACKGROUND OF THE INVENTION

The present invention relates to an electronic type memo device that stores hand-written input data in pairs with index data and reads the desired hand-written data by retrieving the index data.

DESCRIPTION OF THE PRIOR ART

Conventionally, there are such pocketable computers that contain electronic type memo functions capable of preliminarily registering messages and schedules so that these data can be easily accessed at a designated time for delivery to the operators. Typically, some of these prior arts are disclosed in the U.S. Pat. Nos. 3,999,050 and 4,117,542.

Conventional computers still have a variety of problems to solve. For example, operators are obliged to operate keys in order to register retrieve a great variety of data by spending much time and operating a number of input keys.

OBJECT & SUMMARY OF THE INVENTION

The present invention aims at completely solving these problems by providing an electronic type memo device that allows the operator to input desired hand-written data and register or retrieve the designated data by applying an extremely simplified procedure using a minimum number of input keys, while it also features economical cost in its manufacturing process and compact configuration.

The preferred embodiment of the present invention provides an electronic type memo device that stores hand-written data in pairs with index data and reads the desired hand-written data by retrieving the index data, while featuring an extremely simplified operational procedure during the data input, registration, and retrieval, plus operational efficiency as well.

DETAILED DESCRIPTION OF THE INVENTION

Figure 1:
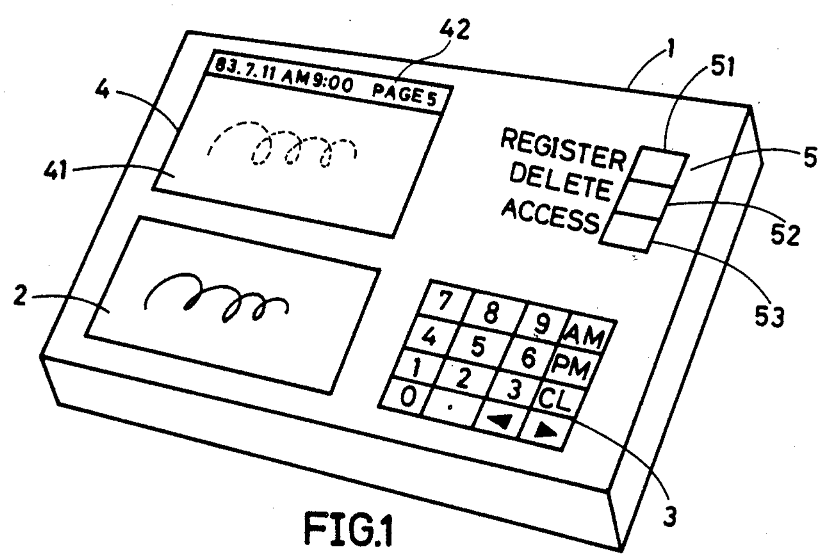
FIG. 1 shows an external view of the electronic type memo device incorporating the preferred embodiment of the present invention.

FIG. 1 shows the external view of the electronic type memo device reflecting the preferred embodiment of the present invention. Reference number 1 indicates the electronic type memo device. This unit is provided with a hand-writing tablet 2 for entry of the hand-written data, an index data input unit 3 for the entry of index data including time, dates, and page numbers, display unit 4, hand-written input data display unit 41, index data display unit 42, control key unit 5, including register key 51 for registering the input data, delete key 52 for deleting unnecessary data, and access key 53 for accessing the input data, respectively. Note that the display unit may be composed of an LCD display. The index key unit 3 is made available for dealing with the index data during retrieval.

Figure 2:
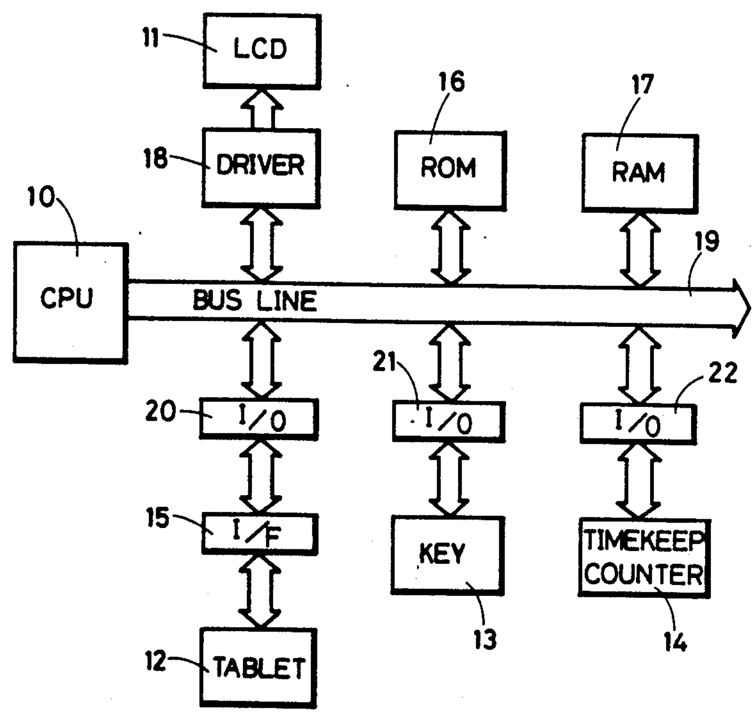
FIG. 2 shows a schematic diagram of the electronic type memo device incorporating the preferred embodiment.

FIG. 2 shows a simplified schematic diagram of the preferred embodiment of the present invention. Reference number 10 indicates the microprocessor conventionally called CPU, number 11 the display unit comprising LCD, number 12 the tablet available for the entry of hand-written input data, and number 13 indicates the key input comprising the key input units 3 and 5 shown in FIG. 1. Referene number 14 indicates a clock and counter unit, number 15 an interface, number 16 a ROM, number 17 a RAM, number 18 a display driver, number 19 a bus line, and numbers 20 to 22 indicate the I/O ports, respectively. The clock-counter unit 14 makes up the index data to be displayed in the header which is composed of the display unit 42 shown in FIG. 1. The index data is then delivered to the display unit 11 together with the hand-written input data sent from the tablet 12. Key 13 shown in FIG. 2 registers these data into memory, in particular into RAM 17, and accesses the data from this memory, or deletes them if necessary.

Figure 3:
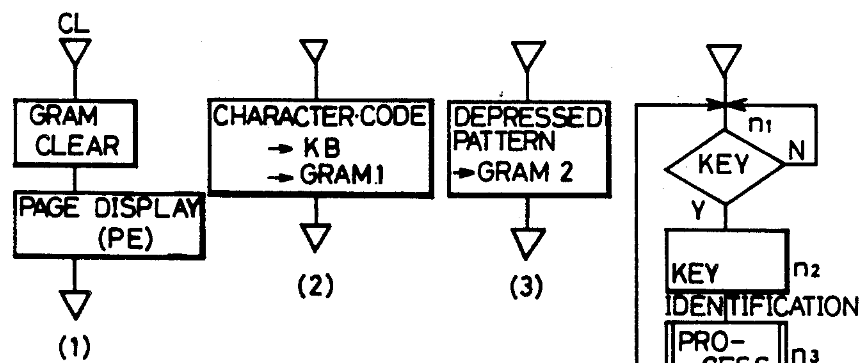
FIGS. 3 and 4 respectively show flowcharts describing the operations of the electronic type memo device.
Figure 4:
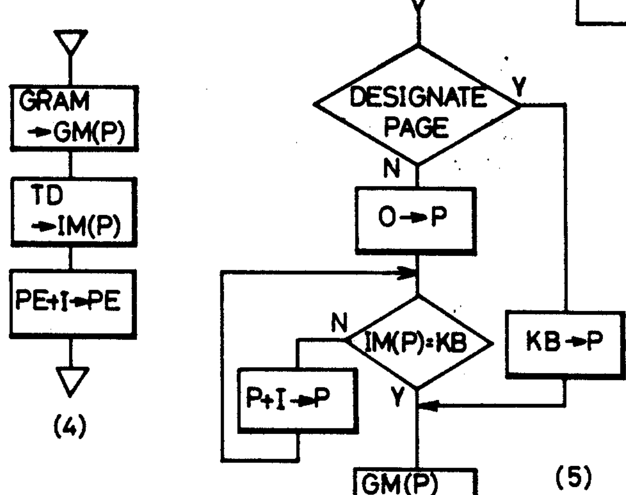
Figure 4:
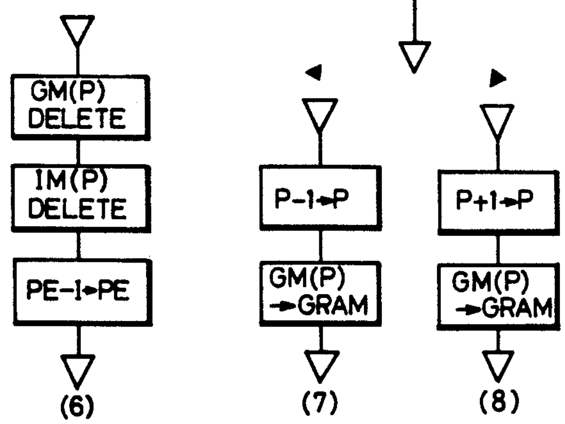

FIGS. 3 and 4 respectively show the flowcharts describing the system operation procedures. Of these, the flowchart shown in FIG. 3 describes the normal key input procedures and the flowchart shown in FIG. 4 describes the operation procedures in response to respective input keys. In the flowchart shown in FIG. 3, the CPU first identifies the normal key input status. As soon as the key input has been identified (steps n1 and n2), all the needed procedures related to the depressed keys are executed (step n3). Next, procedures in conjunction with the depressed keys shown in FIG. 4 are described below.

Descriptions (1) and (8) respectively relate to steps (1) through (8) of the flowchart shown in FIG. 4.

(1) When the clear key is depressed, the contents stored in the GRAM memory of RAM 17 are thoroughly cleared. GRAM memory is the display memory that stores the contents being displayed in the hand-written data display 41. When the display contents are rewritten, the display unit automatically changes the display. Next, the page display is executed in order that the PE contents storing the new page that follows the already registered page can be displayed. PE denotes a specific area of RAM 17.

(2) When the key [3] that responds to either the index data input key or the retrieval index key is depressed, the corresponding character codes are delivered to KB and GRAM-1 memory areas, KB denoting a key input buffer and GRAM-1 being a part (an area corresponding to number 42 in FIG. 1) of the GRAM memory, while only the decoded data is written into it.

(3) As soon as the hand-written data is input from the handwriting input unit 2, the depressed patterns are written into GRAM-2. GRAM-2 makes up part of the GRAM memory and corresponds to number 41 shown in FIG. 1.

(4) When the registration key 51 is depressed, the GRAM contents are delivered to GM (P), and then the index data contents TD including the dates and time are sent to IM (P). GM denoting a memory storing the graphic pattern data, while GM (P) denoting the area corresponding to page P. IM denotes such a memory storing the index data including the dates and time, while IM (P) denotes the area corresponding to page P. After completing these procedures, both the memo data and the index data are registered in pairs. After completing registration of these, PE is incremented for renewing pages.

(5) Access procedures are described below. After the entry of the designated index data via the index key unit 3, when the access key 53 is depressed, the CPU then identifies whether the page or the index has been designated. In this example, the CPU first reads the index memory IM from the start point, and then identifies whether the read-out data exactly matches the key input buffer KB, i.e., the designated index, or not. The CPU sequentially executes the operations for identifying all the index data, and if they correctly match, the CPU then determines that the needed page P has been correctly identified, and as a result, the GM (P) contents are read by GRAM. Finally, a specific memo data exactly matching the designated index is displayed. After a specific page has been designated, this page can be directly accessed by depressing the access key.

(6) After the designated page has been accessed, if the delete key is depressed, GM (P) and IM (P) are both deleted and stuffed into memory. Finally, PE is decremented for renewing pages.

(7) While a specific memo data is being read, if key is depressed, page P is then decremented and GM (P) is delivered to GRAM before eventually being displayed.

(8) Likewise, if key is depressed, page P is incremented so that this page can be displayed.

As is clear from the foregoing description, the electronic type memo device incorporating the preferred embodiment of the present invention conveniently allows the operator to input any desired hand-written data via an extremely simplified procedure to execute the data registration and retrieval using a minimum number of input keys, and in addition, it can be manufactured at an advantageous cost and in compact size.

What is claimed is:

1. An electronic type memo device comprising:

hand-written data input means for entering hand-written data into said device;

key data input means for entering index data including date, time and page number into said device, said index data being associated with specific hand-written data;

memory means for storing said hand-written data and associated index data in pairs;

display means for displaying said hand-written data and associated index data of said pairs simultaneously; and wherein said hand-written data input means includes means for entering all the hand-written data associated with specific index data substantially simultaneously.

* * * * *